Oct. 7, 1930. H. E. ALTGELT 1,777,511
AGRICULTURAL IMPLEMENT
Filed Aug. 8, 1927 2 Sheets-Sheet 2
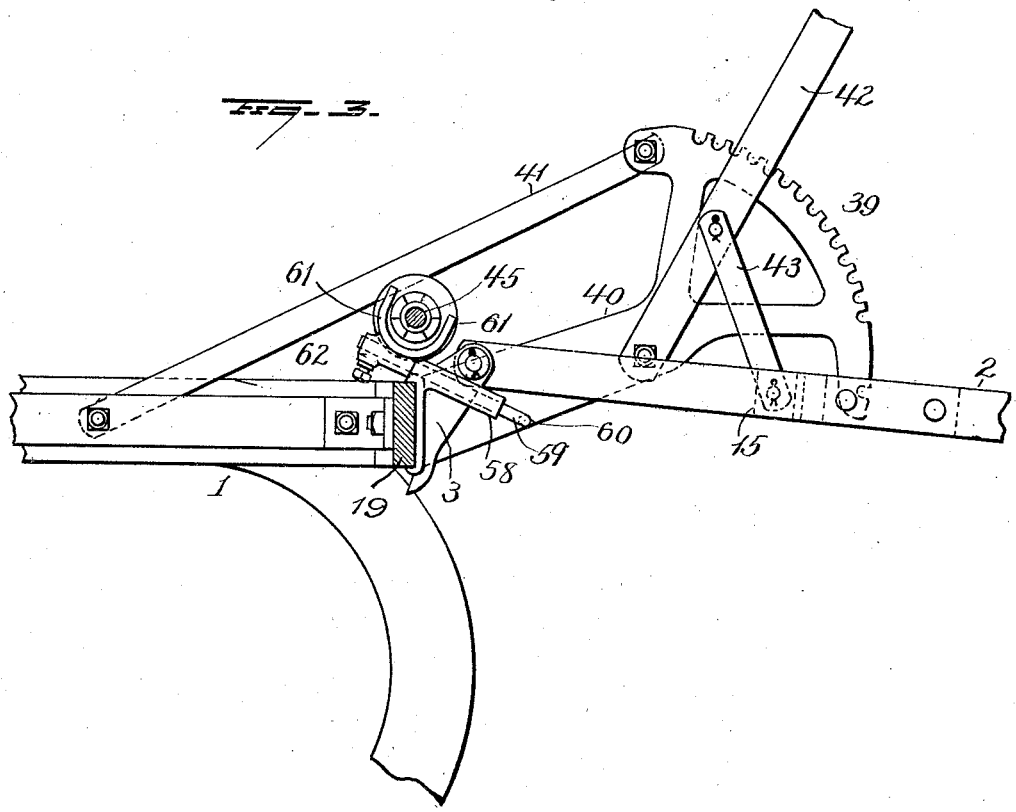
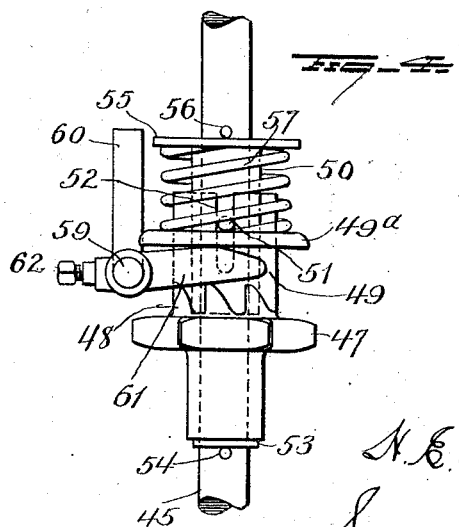
Inventor
H. E. Altgelt
By Seymour & Bright
Attorneys Patented Oct. 7, 1930

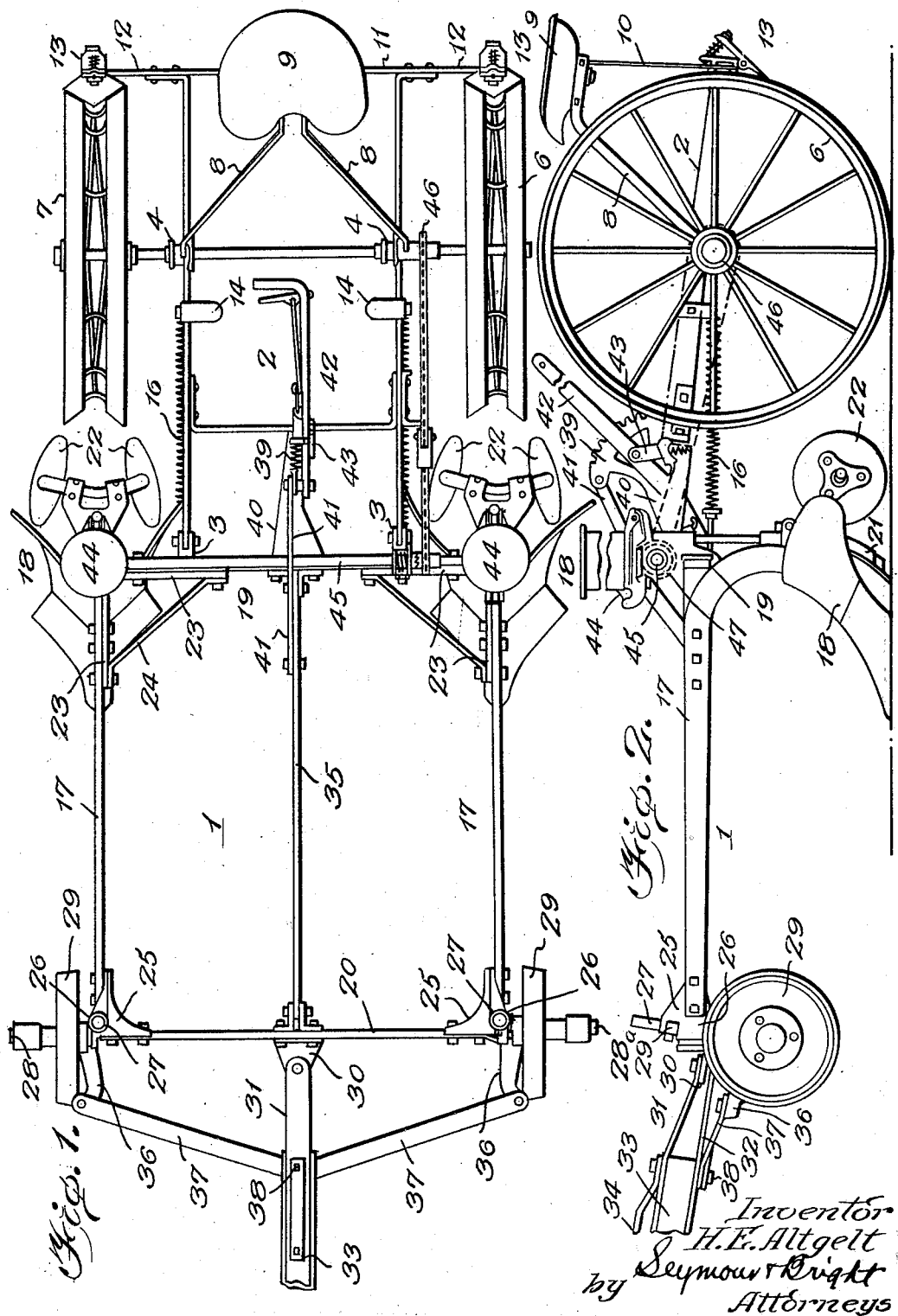

1,777,511

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

AGRICULTURAL IMPLEMENT

Application filed August 8, 1927. Serial No. 211,568.

This invention relates to improvements in agricultural implements, and more particularly to two-row listers,—one object being to provide improved front supporting and draft mechanism for a lister to be horse-drawn, and to so construct such mechanism and associate the same with the front portion of the lister framework that guiding the implement and turning the same at the ends of a field shall be facilitated.

A further object is to improve in various other respects the construction of a two-row lister, and to facilitate the raising and lowering of the soil engaging elements.

With these and other objects in view, the invention consists in certain novel features as hereinafter set forth and pointed out in the claims.

In the accompanying drawings:

Figure 1 is a plan view of a two-row lister, illustrating an embodiment of the invention;

Figure 2 is a view in side elevation;

Figure 3 is a detail view showing the lifting and clutch devices, and Figure 4 is a detail view showing the clutch devices on the feed shaft for controlling the operation of the latter.

My improved lister includes front and rear frames 1 and 2 hinged together end to end through the medium of brackets 3 secured to one of said frames and having pivotal connection with the other frame.

In the embodiment of the invention shown in the drawing, the rear frame 2 is made narrower than the front frame 1 and has secured to its parallel side members, bearings 4 for a rear axle 5 which projects at its ends appreciably beyond the sides of the frame 2. Carrying wheels 6, 7 are located at respective ends of the axle 5 and are disposed directly in rear of soil engaging devices (hereinafter described) carried by the front frame 1 at the rear corners thereof. The wheel 6 is secured rigidly to the axle for reasons which will hereinafter appear, but the wheel 7 may be loose on the axle.

Supports 8 for a seat 9 are secured to the side bars of the rear frame at or near the axle bearings and a vertical seat support 10 may be located between the seat and the rear cross bar 11 of the rear frame 2. This cross bar may be extended laterally beyond respective sides of the rear frame, as shown at 12, and thus provide means for carrying scrapers 13 for the carrying wheels.

Foot rests 14, 14 are secured to the side bars of the rear frame and in advance of these foot rests, the said side bars are connected by a transverse brace bar 15. The foot rests 14, 14 serve also as anchoring means for the rear ends of lifting springs 16, the forward ends of the latter being attached to the brackets 3 secured to the rear cross bar of the front frame.

The front frame 1 comprises two plow beams 17 having rear standards to which lister bases 18 or other furrow opener devices are secured a rear cross bar 19, and a front cross bar 20. The beams 17 also carry seed spouts 21 and seed coverers 22. The end portions of the rear cross bar 19 are secured to the rear portions of the beams 17 through the medium of angle braces 23 and diagonal braces 24. The front cross bar 20 is connected at its ends with the forward ends of the beams 17, through the medium of angle brackets 25 securely bolted to said beams and cross bar. The brackets 25 are constructed to provide bearing sleeves 26 for the accommodation of the standard portions of front axles 27, the cranked portions 28 of said axles being made to project laterally with respect to the sides of the frame 1 and receive the front wheels 29 so that each of the latter will run at one side of the vertical axis of its axle and not trail behind such axis as in the case of a caster wheel. Collars 29ª on the axles and in recesses in the bearing brackets serve to prevent vertical displacement of the axles.

A bracket 30 is bolted to the front cross bar 20 centrally between the ends thereof, and to this bracket, the rear ends of straps 31, 32 are swiveled, said straps being secured to the rear portion of a draft pole 33 and constituting the means of said pole with the front frame of the implement. A hammer-strap 34 is secured to the pole for the accommodation of the main evener bar (not shown).

In order that the front cross bar 20 with which the draft pole is connected shall be protected from bending when subjected to excessive draft strain, a central longitudinal brace 35 connecting said front cross bar 20 with the rear cross bar 19 of the front frame, is employed.

Arms 36 are made rigid with the front axles 27 and project forwardly therefrom. The outer end portions of links 37 are pivotally connected with said arms 36 and the inner ends of said links are pivotally connected at 38 with the rear end portion of the draft pole. It will be observed that with the construction above described, the front wheels are dirigibly supported so that they will be disposed laterally of and parallel with the vertical portions of their axles, and by connecting the pivoted draft pole with the loosely mounted axles, the front wheels become steering or guiding wheels and the guiding or steering is accomplished by lateral movements of the pivoted pole, and is of particular advantage when turning or backing the implement.

The front frame 1 of the implement carries a toothed sector 39, the latter being provided with a comparatively long frame 40 secured at its forward end to the rear cross bar 19 of the front frame and in such manner that said frame 40 will project rearwardly and somewhat upwardly and dispose the sector over the rear frame 2. A brace 41 is connected at one end to the sector frame and at the other end to the central longitudinal brace 35 of the front frame.

A lever 42 is pivoted to the sector frame and said lever is connected by a link 43, with the cross bar or brace 15 of the rear frame 2. In the present instance, in which a horse drawn lister is shown and in which the operator's seat is located at the rear portion of the rear frame 2, the lever 42 is a hand lever located within convenient reach of the operator on the seat 9, and said hand lever will be provided with a suitable detent for cooperation with the teeth of the sector. With such construction, when the lever 42 is moved down on the sector 39, the bases 18, the seed spouts 21 and the seed coverers 22 will be raised out of the ground, and by moving the lever upwardly, these members will be lowered into the ground.

At the rear corners of the front frame 1, seeding mechanisms 44 are located and the drive shaft for the feed devices is shown at 45. A sprocket wheel 46 is secured to the axle 5, (preferably near the carrying wheel 6 fixed to said axle) and motion is transmitted from said sprocket wheel, to a sprocket wheel 47 loosely mounted on the drive shaft. The sprocket wheel 47 is provided on one face with clutch teeth so as to provide a clutch member 48 to be engaged by the teeth of a movable clutch member 49,—which latter is mounted to slide on a sleeve 50 on the shaft 45. A pin 51 passes transversely through the shaft 45 and the sleeve 50 and its respective ends enter slots 52 in the clutch member 49, so that the latter will be rotatable with the drive shaft. A disk or washer 53 on the shaft 45 provides a thrust bearing for one end of the hub of the sprocket wheel and said washer engages a pin 54 passing transversely through the shaft 45, and thus longitudinal displacement of the sprocket wheel and clutch member carried thereby in one direction is prevented, displacement of the same in the other direction being prevented by the sleeve 50. A disk or washer 55 is located on the shaft 45 in spaced relation to the clutch member 49 and is prevented from displacement by a pin 56 passing through the shaft. A spring 57 bears at one end against the disk or washer 55 and at its other end against a flange 49$^a$ of the clutch member 49 and serves normally to press said clutch member into locked relation to the clutch member 48 on the sprocket wheel, so that during the normal operation of the implement, motion will be transmitted from the carrying wheel 6 and axle 5, through the sprocket gearing and clutch devices to the drive shaft 45.

One of the brackets 3 (by means of which the front and rear frames 1 and 2 are hinged together) is provided with a sleeve 58 which forms a mounting for a clutch lever 59 having at one end a crank arm 60 and provided at its other end with a yoke 61 secured thereto by a set screw 62, said yoke being positioned to embrace the clutch member 49 and engage the flange 49$^a$ thereof. The arm 60 of the clutch lever is normally disposed under one of the side bars of the rear frame 2, so that when the bases 18 and the members associated therewith are raised, and the machine is not planting, the arm 60 of the clutch lever will engage under that side bar of frame 2 which is disposed over it, and said clutch lever will be automatically operated to disengage the clutch members and thus disengage the planting mechanism. When the front frame is lowered to bring the soil engaging members into operative positions, the arm 60 of the clutch lever will move downwardly from the side bar of the frame 2 and the spring 57 will operate to automatically close the clutch and effect operative connection of the planting mechanism through the gearing, with the axle 5 and carrying wheel 6.

Having fully described my invention what I claim as new and desire to secure by Letters Patent, is:—

1. In a lister, the combination of a frame comprising parallel plow beams, a rear cross bar, bracing means connecting said rear cross bar with said plow beams, and brackets connecting the front cross bar with said plow beams, said last-mentioned brackets carrying axle bearings, dirigible front wheels, standard axles for said wheels revolubly mounted in said bearings, arms on said axles, a horizontally swingable draft member pivotally connected with the front cross bar, and links pivotally connected with said draft member and with the respective axle arms.

2. In a lister, the combination of front and rear frames having hinge connection with each other, the sides of the front frame being plow beams, an axle and wheels for the rear frame, soil engaging members at the rear ends of the plow beam side members of the front frame, dirigible wheels at the forward portion of the front frame, axles for said wheels, arms on said last-mentioned axles, a bracket secured on the front end at the center thereof, a horizontally shiftable draft member, arms secured to the top and bottom of said draft member and pivotally connected with the bracket on the front frame, and links pivotally connected with said draft member and with the respective axle arms.

In testimony whereof, I have signed this specification.

HERMAN E. ALTGELT.